United States Patent

[11] 3,568,693

| [72] | Inventor | Julius Friedrich Vandrey<br>Perry Hall, Md. |
|---|---|---|
| [21] | Appl. No. | 634,538 |
| [22] | Filed | Apr. 28, 1967 |
| [45] | Patented | Mar. 9, 1971 |
| [73] | Assignee | Martin-Marietta Corporation<br>New York, N.Y. |

[54] FLUIDIC SENSING DEVICE AND METHOD
13 Claims, 3 Drawing Figs.

[52] U.S. Cl. .................................................. 137/1,
137/81.5, 73/355

[51] Int. Cl. .................................................. G01k 11/00,
F15c 4/00

[50] Field of Search ........................................ 137/81.5,
251; 73/(Inquired), 54, 55, 349, 355; 250/43.5,
45; 137/1, 334, 341; 73/193

[56] References Cited
UNITED STATES PATENTS

| 2,459,483 | 1/1949 | Zimmer et al. | 73/55 |
|---|---|---|---|
| 2,981,818 | 4/1961 | Trabiley | 137/341X |
| 3,228,411 | 1/1966 | Straub | 137/81.5 |
| 3,386,290 | 6/1968 | Egli | 137/81.5X |
| 3,388,862 | 6/1968 | Gabrielson | 137/81.5X |
| 3,452,767 | 7/1969 | Posingies | 137/81.5 |
| 2,988,914 | 6/1961 | Jones | 73/54 |
| 3,105,379 | 10/1963 | Ellison et al. | 137/251 |
| 3,234,781 | 2/1966 | Bragg | 73/55 |
| 3,405,728 | 10/1968 | Dexter | 137/251 |
| 3,417,771 | 12/1968 | Ernst | 137/81.5 |

*Primary Examiner* — William R. Cline
*Attorneys* — Robert L. Berger, Gay Chin and James B. Eisel ABSTRACT: A sensing element for use with fluidic circuitry. The element is formed of a length of capillary tubing having a pressure detecting tap at both ends. By imposing an electric current along the tube, the viscosity of fluid within the tube is altered by heating and a fluidic transducer is obtained. Also, by subjecting the capillary tube to external radiation, it will function as the sensing element of a radiation sensing bolometer.

PATENTED MAR 9 1971
3,568,693
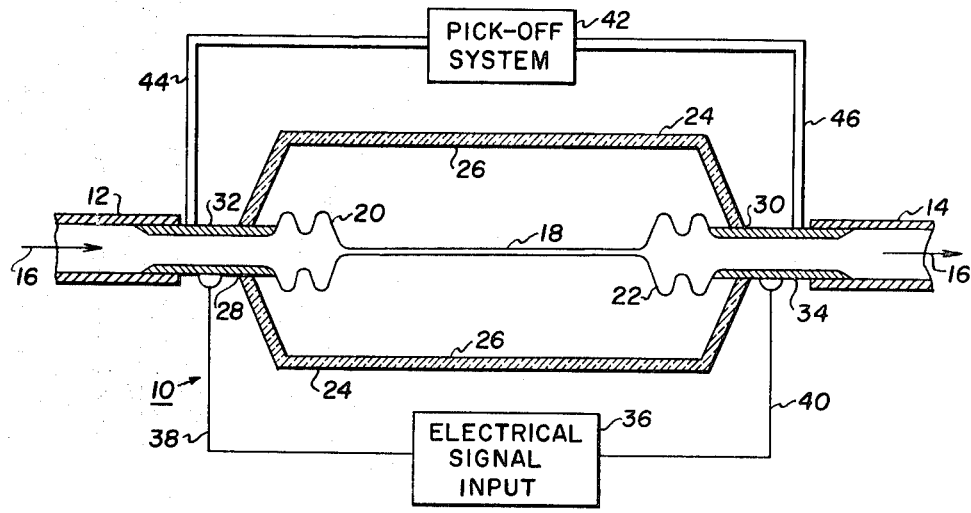
FIG. 1
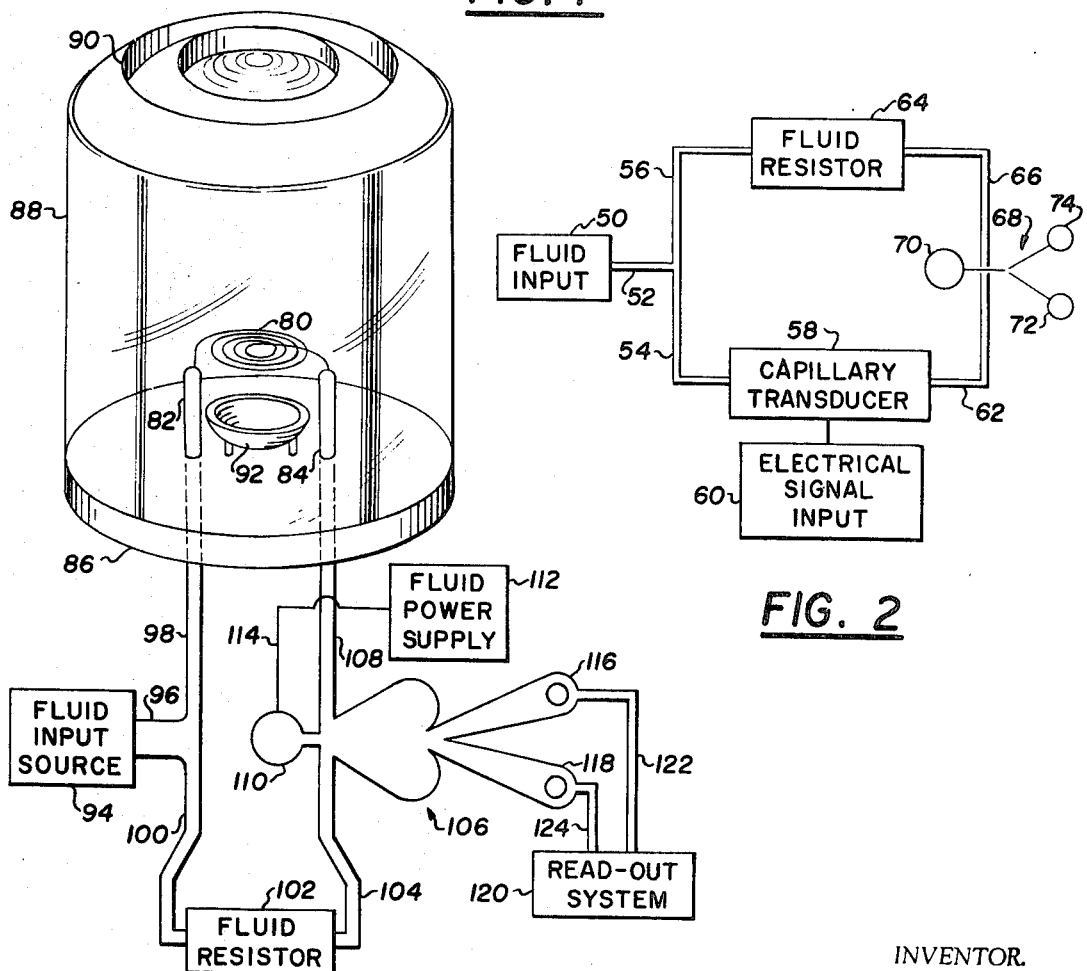
FIG. 2
FIG. 3
INVENTOR.
JULIUS FRIEDRICH VANDREY
BY
ATTORNEY

FLUIDIC SENSING DEVICE AND METHOD

BACKGROUND OF THE INVENTION

1. Field of the Invention

This invention relates to sensing devices, more particularly, to transducing and sensing implements incorporated within fluidic circuits, bolometers and related systems.

2. Description of the Prior Art

The evolution of automated production techniques, complex guidance systems and similar technological advances has imposed a heightened emphasis upon innovations and improvements in the technology of control systems. This technology finds its basis in sensing devices. These sensing implements may be incorporated within control systems either in a mode reacting to a quantity or quality desired to be monitored so as to measure, or the implements respond to a given preselected external stimulus to incite a reaction within a system so as to evolve a manipulative function. The latter mode is evidenced in transducer developments, while the former is initially encountered in the field of measuring and testing. In either mode, however, common sensing techniques incorporating the same physical phenomena may be utilized.

With the advent of pure fluid, fluidic or flueric systems wherein a common gas or liquid is caused to perform logic, amplification and like functions otherwise derived with electronic circuitry, there has arisen a corresponding need for sensing implements which can be effectively incorporated within the fluid circuits. For instance, it is often desired to introduce manipulative commands into a fluidic control system from an electrical carrier. Such requirements generally arise where the instructions originate from devices whose output is an electric signal such as thermistors, photoelectric sensors and the like, or from networks connected with remote command stations whose instructions are most readily transmitted electrically. The transducer devices heretofore developed to insert these commands into fluidic systems have been of limited effectiveness due principally to the necessity for providing an electrofluid or mechanical-fluid interface within the otherwise pure fluid system. Several designs for transducers utilizing an interface connection with the fluid circuit have been introduced to industry, however, none have met with general acceptance.

Exemplary approaches made to the development of a fluid-electrosignal interface include the incorporation of an electric sparking device within the control parts of fluid amplifiers to cause power stream diversion; the insertion of piezoelectric crystal-actuated valving within fluidic components; and the use of relay actuated control port valving. In each of these approaches, however, the transducing devices are incapable of reliably introducing electrical signals in analogue form. The availability of such signal injection is actively sought, inasmuch as its use permits discrete and smooth mechanical manipulation of fluid system controlled devices, the advantages of which will be apparent to those engaged in the control system arts.

Technical literature has suggested that analogue signals may be transduced into fluidic systems through such means as the electrostatic deflection of a free jet of a dielectric liquid; the use of magnetohydrodynamic pumping of conducting liquid systems, or the use of electro-osmotic pumping. In each of these approaches, the advantages otherwise gained from a fluidic system are compromised to the point of impracticability. The use of heat additions in the form of electric power to a portion of the flow within fluidic systems for affecting an analogue signal input has heretofore been dismissed in view of the relatively high power requirements and relatively lengthy response times resulting from the interface association of heating elements and fluid stream. It will be observed that in none of the above approaches is the typical system fluid itself physically altered to reflect an analogue input signal.

The introduction to industry of a sensing technique operating upon a change in fluid character so as to evoke an analogue signal function will find ready acceptance for use within the readout circuitry of sensing and recording devices as well as for serving in a transducer input category. By providing a sensing function within the fluid itself, no transducing device interface restrictions are encountered and the fluidic circuitry in and of itself may be utilized for performing the ultimate readout and/or control function. The somewhat pure fluid system thereby derived will advantageously minimize aberrations caused by the union of nonanalogous systems which must be accounted for with additional corrective measures.

A pure fluid sensing technique also will find particular value in the design of radiation sensing bolometers and the like. In the past, these devices have been designed and fabricated using electric signal deriving components. Typically, the bolometers are fashioned having heat or radiation sensitive elements upon which a collective optical system a quantity of radiation desired to be detected and interpreted. The temperature changes imposed by the focused radiation upon the elements provoke alterations in the intensity of current passing through the elements. This change can then be measured by conventional electrical pickoff arrangements so as to provide an interpretive output. The radiation sensing bolometer devices find considerable application in automatic navigation and control systems wherein they provide a sensing function for tracking the sun or stars or like radiative reference points. Bolometer implements are also used for the straightforward measurement of heat or radiation outputs in fire detection systems or in furnace temperature evaluations. Their usefulness encounters limitations, however, where radiation intensities become very high.

Under intense concentrations of radiation, for instance in the order of 100 watts per cm.$^2$, more or less elaborate precautions must be taken to protect not only the sensing elements of the bolometers, but also their contiguous electronic readout circuitry from damage and resulting inaccuracies. For numerous applications of the devices, corrections for this limitation render them impractical or undesirably expensive. The incorporation of a pure fluid sensing element within bolometers would ideally offer a self-cooling and self-protecting system for the very high radiation measurement function, however, a suitable pure fluid sensing element has not heretofore been introduced to industry.

Heat-responsive fluid sensing techniques have, for the most part, been characterized by the measurement of a volumetric reaction to temperature change. This interrelation of the thermal expansion of a gas to a sensing function unfortunately is not conveniently adaptable to modern fluidic circuitry technology, inasmuch as the techniques are often limited to use with gases only and to static, preselected and confined volumes. By comparison, it is now considered most advantageous to incorporate the fluid sensing media intimately within a pure fluid control circuitry.

Measurement techniques for characteristics other than temperature-volume relationships have been observed to find little acceptance by industry. Generally, the innovations for measuring or sensing characteristics a such as the coefficient of viscosity of a fluid have been limited to elaborate laboratory mechanisms operable only on a "one shot" basis whereby they are incapable of continuous sampling. It has been apparent that such a form of sample sensing is not adaptable to fluidic circuitries wherein a liquid or gas is maintained in constant movement. Further, the insertion of such sensing arrangements, in most applications, would necessitate unacceptably long response times between the sensing and reaction functions of a measuring circuitry.

SUMMARY

The invention now presented offers solution to the problems and deficiencies outlined above by providing, inter alia, a sensing implement and technique which is readily incorporated within fluidic systems without requiring the insertion of a mechanical-fluid interface structure into its circuitry. The inventive technique, which is characterized by the incorporation of a capillary tube sensitive to changes of the coefficient of viscosity of system fluid, provides simple and reliable responses or reactions to either an induced electrically derived signal input or to externally impinging radiation.

The capillary sensing implement of the invention is readily incorporated within a conventional fluidic system and advantageously utilizes the same working fluid as is used within the circuitry of that system.

The sensing element of the invention readily serves as a transducer for introducing externally derived command signals into a fluidic control system or the like, and more particularly, the element is capable of receiving and introducing electrical analogue signals into the control circuitry.

By virtue of its relatively simple structure, the sensing element may serve within a broad variety of design requirements including use with either gas or liquid containing fluid circuits.

The invention is further characterized in introducing a radiation sensing bolometer which utilizes the aforediscussed capillary sensing element. A bolometer fabricated according to the instant invention may advantageously utilize an all-fluid sensing, pickoff and readout circuitry. Thusly constructed, the inventive fluidic bolometer may be used to measure very high radiation intensities as a result of the inherent self-cooling attributes of an all-fluid circuitry.

The inherent self-cooling character of a fluidic bolometer according to the invention may additionally be incorporated as the sensing implement within attitude control circuitries. As such, the bolometer will impart a greater latitude of maneuverability or range for devices utilizing such controls.

A further advantage to be derived from a fluidic bolometer in accordance with the invention is its capability of ready incorporation within an overall hydraulic control system utilizing the same fluid as that system in continual circulation.

Another object of the invention is to provide a capillary channel adapted to swiftly react by fluid viscosity alteration to external, heat inducing stimulation.

A further object of the invention is to provide a fluidic transducer characterized in utilizing a capillary sensing element operable within the transition region between laminar and turbulent flow such that the aforesaid transition serves as a fluid circuit signal input for digital information.

These and other objects and advantages of the invention will become apparent from the following detailed description and drawings.

BRIEF DESCRIPTION OF THE DRAWINGS

FIG. 1 is a partially schematic and sectional representation of a transducer utilizing a sensing element in accordance with the invention.

FIG. 2 is a fully schematic representation of a simplified fluidic circuitry utilizing the transducer of FIG. 1.

FIG. 3 is a perspective and partially schematic representation of a fluidic bolometer fabricated according to the instant invention.

DESCRIPTION OF THE PREFERRED EMBODIMENTS

The sensing element of the present invention will be seen to provide a straightforward approach to the introduction of electrical analogue or digital signals into a fluidic control system. Similarly, the sensing element may be made advantageously reactive to imposed radiation. In either approach to its use, no electric to fluidic interface problems are encountered. The discussion to follow describes the theory of operation of the sensing element in connection with a transducer structure; however, it will be apparent that it is capable of general application.

1. Transducer Application

Referring to FIG. 1, the sensing element is shown incorporated within a transducer devised for use in translating an electrical signal into a fluidic signal. The transducer, shown generally at 10 is serially interconnected as a component within a fluid circuit at fluid conduit junctions 12 and 14. Circuitry fluid passing through the device 10, as indicated by arrows 16, enters and flows through a thin-walled metal capillary 18.

Capillary 18, the sensing element of the system, is suspended under a slight tensile force between integral elastic bellows as depicted at 20 and 22. The minor tension imposed upon the capillary tube 18 by the bellows structures provides assurance that it will remain aligned or straight even though its length may be slightly altered by thermal expansion and contraction. Capillary 18 along with the suspending bellows 20 and 22, is enclosed or encapsulated within a cylindrical nonconducting jacket or enclosure 24. The enclosure 24 is preferably evacuated and fashioned having its inner wall 26 mirror-plated with a covering of silver, aluminum, rhodium or similarly highly reflecting metallic surface. Typical of the nonconducting materials from which the jacket 24 may be fabricated are glass, quartz, ceramic or the like. A ceramic-to-metal seal is provided at junctions 28 and 30 for uniting the jacket-to-metal electrode lead-in tubes 32 and 34. The latter tubes serve the obvious functions of simplifying fabrication procedures and providing fluidic system interconnection as well as electrical signal input connection with the capillary 18.

Jacket structure 24 serves to isolate the capillary arrangement from ambient temperature variations as well as to minimize its heat losses and, accordingly, render it more sensitive to the signal inputs deriving from an external electrical command source shown generally at 36. Electrical connection between the signal input 36 and the capillary 18 is provided by leads 38 and 40 which are connected respectively to lead-in tubes 32 and 34.

The pickoff portion of the interconnecting fluidic circuitry is similarly depicted schematically by the representative block 42 which connects to both sides of the capillary through conduits 44 and 46. The particular connection utilized with the transducer 10 will depend upon a given overall circuit design function, however, the system 42 serves to reflect any change in pressure drop across the capillary 18.

The transducer functions upon the physical basis that a change in the fluid flow resistance across the capillary 18 sensing element will occur when an electric current is passed through the capillary wall to alter the viscosity of the fluid passing therethrough. Heat energy for altering the viscosity is produced within the capillary tube by virtue of its resistance to the induced electrical current.

In a typical application of the transducer, the capillary 18 may be selected having a length between about 5 and 10 cm., with an inner diameter of between about 0.2 and 0.5mm., 0.2 and 0.3 mm. The material from which the capillary is fabricated is selected having a relatively high specific resistance, adequate mechanical and thermal strength and preferably a low value of thermal capacity. The latter quality is defined as the product of density and specific heat, and materials having values between about 3 to 4 watt seconds/°K. cm.$^3$ will be found to qualify. Typical electrical resistance values for the capillary are generally around 0.25 ohms/cm. Under certain fluid system design criteria, it may be additionally necessary to select a material having a relatively high corrosion resistance.

For conventional applications, materials such as constantan or stainless steel will be found acceptable.

The electrical signal input 36 may be derived from a relatively low voltage signal generator capable of delivering relatively high-powered electrical signals. Depending upon the size of the transducer 10, the operating fluid and its flow rate, the imposed signals typically have values between 1 and 100 watts. The imposed signal may be either AC or DC, however, an audiofrequency AC (e.g. around 400 c.p.s.) has been found to be both practical and convenient for the purpose at hand.

Turning to the theory and operation of the transducer heretofore described, it has been pointed out that its physical principle is premised upon the change of coefficient of viscosity of all fluids, whether liquids or gases, when encountering a temperature change. When the thin-walled capillary 18 of the transducer is heated by passing an electric current from one end to the other, its flow resistance will correspondingly change. Viscosity of liquids as a function of temperature is generally given by an expression of the form:

$$\mu = \mu_o e^{\alpha(T-T_o)} \quad (1)$$

$\mu$ is the coefficient of viscosity, $\mu_o$ is the initial coefficient of viscosity at reference temperature, $\alpha$ is an empirical constant, $T$ is the temperature corresponding to and $T_o$ is the reference temperature.

The pressure drop across the capillary 18 in an unheated state is given by the conventional formula:

$$\Delta p = p(o) - p(l) = \frac{128\mu \cdot Ql}{\pi d^4} \quad (2)$$

where $l$ is length, $d$ is internal diameter and $Q$ is the flow rate (cm.3/sec.).

If the capillary 18 has an electrical resistance of $R$ ohms and is heated by applying a voltage $E$ thereacross, the pressure drop given at equation (2) changes by an amount $\delta p$, which is approximately given by the expression:

$$\frac{\sigma p}{\Delta p} \approx \frac{-\alpha}{2Q\rho c} \cdot \frac{E^2}{R} \quad (3)$$

where $\rho$ and $C$ are the density (g./cm.$^3$) and specific heat (watt seconds/gm.°K.) of the liquid respectively.

Selecting water as the fluid within the system and, accordingly, inserting typical values for the constants of equation (3), i.e. $\alpha=0.02$, $\rho=1$, $c=4.19$ and $Q=1$cm.$^3$/sec.; the following sensitivity is realized:

$$\frac{\sigma p}{\Delta p \cdot E^2/R} = -0.24 \text{ per cent per watt} \quad (4)$$

This value will be found acceptable for a great number of applications, however, it may be readily increased several times by using a different fluid.

The response times are slightly longer than the time of transit of the liquid passing through the capillary. This results from the necessity for heating the material of wall 18 by the imposed current to a temperature higher by a constant amount than the local fluid temperature. The latter amount may be expressed as follows:

$$T_{wall} - T_{fluid} = \frac{1}{4.12\pi l\lambda_f} \cdot \frac{E^2}{R} \quad (5)$$

where $\lambda f$ is the value of heat conductivity.

In order to obtain an adequate heat transfer for typical values of $l=10$ cm. and $\lambda f=0.6$ watt/cm.°K., there results:

$$\frac{T_{wall} - T_{fluid}}{E^2/R} = 0.013°K. \text{ per watt} \quad (6)$$

It will be apparent to those skilled in the art that the above FIG. represents an insignificant amount for design purposes. Response times of the order of one-tenth second are therefore not difficult to obtain with the inventive device. Of course careful design techniques will result in improved response times.

The fluid pressure difference applied across the two ends of the transducer is preferably selected in a manner such that the flow through capillary 18 remains laminar under both heated and unheated operating conditions. The Reynold's number, accordingly, should preferably continually remain below a value of 2,000. Inserting the conventional Reynold's equation in equation (2) there results an estimate of maximum pressure difference:

$$\Delta p < 6.4 \times 10^4 \frac{l}{d^3\rho} \cdot \mu_{min}^2 \text{ dynes/cm.}^2 \quad (7)$$

where $\mu_{min}$ is the smallest value of the viscosity coefficient which can occur in the operation of the transducer. The limitation to laminar flow affords the advantage of relatively simplified performance prediction.

The theory of operation of the transducer is somewhat altered where the circuitry fluid selected is a gas. This complexity arises due to the necessity of accounting for the expansion and work done by the expanding gas. The practical results obtainable, however, are not particularly different from those obtained with liquids.

As an additional mode of functioning, the transducer may be made to react to a digital input signal by operating it within the transition region between laminar and turbulent flow. For instance, where a gas is incorporated as the fluid, its flow would be turbulent when the capillary 18 is unheated. When heated, the gas flow would switch or transition to laminar flow.

Similarly, by heating a laminar flowing liquid passing through the capillary within the transition range it would switch to turbulent flow. In order to sustain the transition effect, it may be found useful to roughen the interior wall of the capillary.

Throughout the discussion, the term "capillary" has been used with the meaning of any relatively thin-walled fluid flow conduit or channel which is narrow with respect to its length.

In the operation of the device, the transducer is incorporated within a fluidic circuit in such a manner that the changes in its flow resistance to the electric input signal will produce changes of fluid flow and pressure distribution elsewhere in the circuit. A conventional bridge circuit is generally used for this purpose. The changes in pressure or flow may then be amplified and used as inputs into a fluidic control system for further processing and ultimately, for initiating the control actions for which the system was designed. Turning to FIG. 2, a simplified bridge circuit is illustrated. The circuit of the drawing utilizes a generalized fluid input 50, perhaps deriving from contiguous circuitry. From the input 50 the fluid passes through conduit 52 to divide into branch conduits 54 and 56. Conduit 54 leads to a transducer 58 as described at 10 in FIG. 1, which, without electrical stimulation, imposes a given pressure drop upon the fluid, which exits therefrom at conduit 62. Transducer 58 is connected for signal stimulation from an electrical signal input shown generally at 60. Looking to the other branch, the fluid passes from conduit 56 into a fluidic resistance 64. The resistor 64 is selected so as to match the pressure drop exhibited by the nonstimulated transducer 58. Without stimulation, therefore, the fluids passing within conduits 62 and 66 are of equal pressure or intensity. Conduits 62 and 68 are connected with the control ports of a proportional amplifier generally indicated at 68. The schematically depicted amplifier is shown having a power stream input port 70 and output ports 72 and 74.

It will be apparent that a pressure deviation caused by an input from signal 60 will unbalance the outputs of the control ports connected with conduits 62 and 66. This unbalance will cause a corresponding diversion of the power stream emanating at 70 to alter the pressures and fluid flows at ports 72 and 74. The latter alteration is readily transmitted and translated into a responsive function.

2. Bolometer Application

Looking now to a second preferred use of the sensing element of the invention, a radiation sensing bolometer is illustrated in connection with FIG. 3. The sensing element of the bolometer is a relatively long and narrow fluidic flow channel 80, typically, a thin-walled metal capillary 15 to 30 cm. in length having a 0.5 to 1 mm. bore. It will be understood that different operational criteria will dictate the particular materials and dimensions used throughout the device. The capillary may be provided a blackened outer surface to render it more sensitive to imposed radiation. As depicted, the sensing element 80 is coiled to form a narrow, flat spiral and is suspended from posts 82 and 84 which additionally serve the function of providing fluid flow communication between element 80 and interconnected fluidic circuitry. Posts 82 and 84 are supported upon and extend through a base member 86 which serves as a shield opaque to radiation otherwise impinging upon the contiguous fluidic circuitry interconnected to the element 80. Base 86 further supports a cylindrical housing 88 which, in turn, retains a radiation focusing lens 90 in appropriate position above the sensing element 80. The selection of material for fabricating housing 88 will be dependent upon the particular bolometer application at hand. Situate in alignment beneath the element 80 is a concave front-surface reflector mirror 92.

The above-described sensing portion of the bolometer operates upon the same physical principle as discussed in connection with the transducer embodiment. In the present case, however, radiation focused through the fresnel lens 90 impinges upon the sensing element 80 thereby causing its temperature to elevate. The mirror 92 reflects the emitted radiation back to the rear surface of the element so as to enhance its sensitivity by improving radiation capture. The radiative heating of the sensor 80 reacts to cause a corresponding change in the viscosity of fluid passing therethrough, which, in turn creates a pressure variation capable of being interpreted by interconnected fluidic circuitry. The enclosure defined by the lens 90, housing 88 and base 86 is preferably evacuated in order to stabilize initial temperature conditions near the element.

Turning to the fluidic circuitry in connection beneath the sensing element 80, a fluid supply course for delivering a liquid or gaseous fluid to the sensor circuitry is shown generally at 94. Fluid from the source 94 exits through conduit 96 to divide and flow along branch conduits 98 and 100. Branch conduit 98 forms an extension of post 82 and serves to deliver fluid to one side of the sensing element 80. Branch conduit 100 delivers fluid to a fluid resistance depicted generally at 102. Resistor 102 is selected so as to impart a pressure drop to fluid passing therethrough which is the equivalent of the pressure drop encountered by the fluid as it traverses the length of sensing element 80 under initial or nonradiating conditions. From the resistor 102, the fluid is introduced from along a conduit 104 to one control port of a fluidic proportional amplifier shown generally at 106.

Fluid exiting from the sensing element 80 through post 84 is directed into a conduit 108 which, in turn, interconnects with the amplifier 106 to serve as a control stream port opposite the fluid entering from conduit 104. A power stream is introduced into the amplifier from port 110 which is, in turn, fed from a suitable supply source depicted only generally at 112. Interconnection between the supply 112 and port 110 is illustrated schematically by a line 114. The amplifier 106 is further provided with outlet ducts terminating in ports 116 and 118. A readout system 120 sensitive to the pressures and fluid flows emanating from the outlet ports 116 and 118 is shown generally and in fluid connection with the latter ports respectively through conduits 122 and 124.

During operation, when radiation is focused through the lens 90 to cause a heating of the sensing element 80, there is imposed a change in viscosity of fluid flowing through the latter along with a corresponding alteration of the pressure drop between posts 82 and 84. This pressure alteration is presented along control port conduit 108 which no longer matches the pressure and flow input from control port conduit 104. The resultant control stream unbalance causes a diversion of the amplifier power stream thereby altering the outputs of outlet ports 116 and 118. Readout system 120, using well-known fluidic techniques, may translate the resultant signal into a control or information function.

In an alternative arrangement, the proportional amplifier 106 may be replaced with a bistable fluidic element which is biased such that its output would remain in one output port. The bistable element could be adjusted to switch to an alternate output port only upon the occasion of a predetermined threshold of radiation being absorbed by the sensing element 80. This arrangement may be found useful where limit control design criteria are encountered.

The bolometer arrangement may be readily altered to suit a wide variety of operational conditions. For instance, it may be desired to use it as an independent instrument for measuring very high radiation intensities in the order of from 100 watts/cm.$^2$ to 2 kilowatts/cm.$^2$. No collecting optics may be needed for these very strong radiation fields such as may be encountered with arc image furnaces and the like. The fluid flow through the sensing element provides an inherent cooling mechanism for these applications and a considerably shorter sensing capillary or flow channel, e.g. only a few centimeters long, may be substituted for the spiral design heretofore described. Additionally, for strong radiation applications, it may be desirable to utilize a liquid of relatively high specific heat as the operating fluid.

The sensing element of the bolometer may be any long and narrow flow channel having thin walls fashioned of a material of high termal conductivity, appropriately high melting point and low specific heat for providing a fast response. The sensitivity and dynamic range of the sensing element may readily be varied within wide limits by changing the applied fluid pressure and type of fluid. Mirrors instead Similarly the collecting optics are subject to design variation. Mirrors instead of lenses may be incorporated in the design, or a combination of both may be used. Pure mirror optics will be found preferable where a significant portion of the radiation to be sensed lies outside of the visible spectrum. Further, cylindrical lenses and/or cylindrical mirrors may be used in combination with a straight-line sensing element disposed along the focal line of the optical system.

In another aspect of its practical application, the sensing and fluidic pickoff system of the bolometer may be used somewhat as a thermometer by immersing the sensing portion within the flow of a hot or cold gas or liquid. Inasmuch as the fluid flow through the sensor tends to cool it, the technique may be useful for measuring very high temperatures such as those occuring within combustion chambers. In applications wherein the capillary is immersed within a high-speed gas flow, it will sense the total temperature or enthalpy rather than static temperature.

I claim:

1. Apparatus for converting a quantum of information into corresponding fluid pressure variations comprising:
  a. a sensing element formed from a length of thin-walled capillary adapted to carry within it a continuous flow of fluid;
  b. means for establishing a laminar flow of fluid through said element;
  c. means for exposing said sensing element to an amount of energy corresponding to the information so as to alter the viscosity of said fluid flowing through said element; and
  d. fluidic pickoff means adapted to detect and respond to fluid pressure changes developed along said element by the said alteration of fluid viscosity.

2. The apparatus of claim 1 wherein said sensing element is formed from a metallic material having high specific resistance and low thermal capacity.

3. The apparatus of claim 1 including means for encapsulating said sensing element within an evacuated, thermally insulating enclosure.

4. A transducer for converting variations in an electric signal into corresponding pressure variations within a fluidic system comprising:
  a. a sensing element formed from a length of thin-walled electrically conductive capillary adapted to carry within it a continuous flow of fluid;
  b. means for establishing a laminar flow of fluid through said element;
  c. connecting means for imposing said electric signal along the length of said sensing element in a manner altering the viscosity of said fluid flowing therethrough; and
  d. fluid pressure detection means in connection with said sensing element and adapted to detect and respond to fluid pressure changes developed along the element as a result of the said alteration of viscosity.

5. The transducer of claim 4 including means for encapsulating said sensing element within an evacuated and thermally insulating enclosure.

6. The transducer of claim 4 wherein said sensing element is formed from a material having high specific resistance and low thermal capacity.

7. A radiant energy sensing bolometer comprising in combination:
   a. a sensing element formed from a length of thin-walled capillary adapted to carry within it a continuous flow of fluid;
   b. fluid supply means in fluid transfer connection said sensing element for causing therein a continuous laminar flow of fluid;
   c. mounting means for exposing the sensing element to said radiant energy so as to alter the viscosity of fluid within said element; and
   d. fluidic pickoff means in connection with said element and adapted to respond to fluid pressure changes developed along the element as a result of the said alteration of fluid viscosity.

8. The bolometer of claim 7 wherein said sensing element is formed from a material having a high thermal conductivity and low specific heat.

9. The bolometer of claim 7 including:
   a. means for encapsulating said sensing element within an evacuated enclosure; and
   b. means for isolating said fluidic pickoff means from said radiant energy.

10. The bolometer of claim 7 including optical collecting means for concentrating a quantum of said radiant energy in a manner causing its impingement upon said sensing element.

11. The bolometer of claim 7 in which said fluidic pickoff means is adapted to provide for the proportional amplification of said fluid pressure changes.

12. A method for converting a quantum of energy into corresponding fluid pressure variations comprising the steps of:
   a. causing a fluid to continuously flow in a laminar manner through a narrow, thin-walled channel;
   b. exposing said flowing fluid to said energy in a manner allowing an alteration of the viscosity thereof; and c. detecting the variation of fluid pressure along said channel resulting from the said alteration of viscosity.

13. The method of claim 12 in which said energy is in the form of an electric signal and said flowing fluid is exposed to said energy by impressing said electric signal along said thin-walled channel.